US007674175B2

(12) United States Patent
Yoshimura

(10) Patent No.: US 7,674,175 B2
(45) Date of Patent: Mar. 9, 2010

(54) VIDEO SLOT MACHINE

(75) Inventor: Toshiyuki Yoshimura, Zama (JP)

(73) Assignee: Konami Gaming Incorporated, Las Vegas, NV (US)

( * ) Notice: Subject to any disclaimer, the term of this patent is extended or adjusted under 35 U.S.C. 154(b) by 233 days.

(21) Appl. No.: 11/466,769

(22) Filed: Aug. 24, 2006

(65) Prior Publication Data

US 2007/0060256 A1 Mar. 15, 2007

(30) Foreign Application Priority Data

Aug. 26, 2005 (JP) ............................ 2005-246197

(51) Int. Cl.
*A63F 13/00* (2006.01)

(52) U.S. Cl. ............................ 463/20; 463/30; 463/31; 463/34; 273/138.1; 273/139

(58) Field of Classification Search ..................... 463/9, 463/36, 1, 10–13, 16–21, 23, 25–27, 29–34; 273/139, 143 R, 429, 432, 440, 461, 138.1, 273/138.2, 141 A, 142 B, 142 C, 142 J, 148 R
See application file for complete search history.

(56) References Cited

U.S. PATENT DOCUMENTS 5,152,529 A * 10/1992 Okada ......................... 463/20
5,393,061 A * 2/1995 Manship et al. ............... 463/20
5,472,197 A * 12/1995 Gwiasda et al. ......... 273/143 R
5,766,074 A * 6/1998 Cannon et al. ................ 463/16
5,984,780 A * 11/1999 Takemoto et al. ............. 463/20
5,984,781 A * 11/1999 Sunaga ........................ 463/20
6,056,642 A * 5/2000 Bennett ........................ 463/20
6,142,875 A * 11/2000 Kodachi et al. ............... 463/20
6,165,070 A * 12/2000 Nolte et al. ............. 273/143 R
6,227,971 B1 * 5/2001 Weiss .......................... 463/20
6,270,408 B1 * 8/2001 Sakamoto et al. ............. 463/20

(Continued)

FOREIGN PATENT DOCUMENTS

JP 2001-334019 A 12/2001

(Continued)

OTHER PUBLICATIONS

The Magazine for Capture of Pachisuro (Pachisuro-Koryaku Magazine) Souyou sya, Oct. 1, 1995, pp. 4-10, vol. 4, No. 10/whole No. 37,Futabasha, Japan.

*Primary Examiner*—Dmitry Suhol
*Assistant Examiner*—Arthur O. Hall
(74) *Attorney, Agent, or Firm*—Global IP Counselors, LLP

(57) ABSTRACT

A video slot machine is disclosed in which a plurality of reel images comprising at least two types of arranged symbols are displayed on a monitor. The video slot machine includes a game controller configured to control a game including a unit game in response to a BET operation; a display controller configured to control the monitor such that the symbols of the reel images are successively changed and then stopped for display during the unit game; a change time determination unit configured to determine whether or not it is time to change the reel images; and a reel image changing unit configured to change at least one of the reel images to a different reel image having a different symbol arrangement when the change timing determination unit determines that it is time to change the reel images.

12 Claims, 6 Drawing Sheets

U.S. PATENT DOCUMENTS

| | | | | |
|---|---|---|---|---|
| 6,315,663 | B1 * | 11/2001 | Sakamoto | 463/20 |
| 6,375,570 | B1 * | 4/2002 | Poole | 463/31 |
| 6,544,120 | B2 * | 4/2003 | Ainsworth | 463/20 |
| 6,641,477 | B1 | 11/2003 | Dietz, II | |
| 6,705,944 | B2 * | 3/2004 | Luciano | 463/20 |
| 6,731,313 | B1 | 5/2004 | Kaminkow | |
| 6,923,441 | B2 * | 8/2005 | Inoue | 273/143 R |
| 7,179,166 | B1 * | 2/2007 | Abbott | 463/9 |
| 7,306,520 | B2 * | 12/2007 | Kaminkow et al. | 463/20 |
| 7,371,172 | B2 * | 5/2008 | Inoue | 463/20 |
| 7,503,847 | B2 * | 3/2009 | Baerlocher | 463/16 |
| 2002/0025846 | A1 * | 2/2002 | Bennett et al. | 463/20 |
| 2003/0186737 | A1 * | 10/2003 | Bennett et al. | 463/20 |
| 2004/0014517 | A1 * | 1/2004 | Inoue | 463/20 |
| 2004/0053689 | A1 * | 3/2004 | Hosaka et al. | 463/31 |
| 2004/0102236 | A1 * | 5/2004 | Suda et al. | 463/16 |
| 2004/0110558 | A1 * | 6/2004 | Suda et al. | 463/25 |
| 2005/0170878 | A1 * | 8/2005 | Tachikawa | 463/16 |
| 2005/0282607 | A1 * | 12/2005 | Gauselmann | 463/16 |
| 2006/0058097 | A1 * | 3/2006 | Berman et al. | 463/20 |

FOREIGN PATENT DOCUMENTS

| | | | |
|---|---|---|---|
| JP | 2002-011151 | A | 1/2002 |
| JP | 2002-291982 | A | 10/2002 |
| JP | 2004-215853 | A | 8/2004 |
| JP | 2004-321207 | A | 11/2004 |
| JP | 2005-143942 | A | 6/2005 |

* cited by examiner

VIDEO SLOT MACHINE

CROSS-REFERENCE TO RELATED APPLICATIONS

This application claims priority to Japanese Patent Application No. 2005-246197. The entire disclosure of Japanese Patent Application No. 2005-246197 is hereby incorporated herein by reference.

BACKGROUND OF THE INVENTION

1. Field of the Invention

The present invention relates to a video slot machine that is installed in casinos or the like.

2. Background Information

One type of video slot machine will display a plurality of reel images on a monitor. Each reel image comprises at least two types of symbols that are arranged in a predetermined order, and the symbols will be changed and displayed in response to the rotation of the reels on the monitor. A determination unit of the video slot machine will generate a start signal and determine the symbols to be stopped and displayed on the monitor if it receives credit in response to a BET operation with an operation unit. In addition, the determination unit will successively switch the plurality of symbols displayed on the monitor, and stop the changing display of the reel images in order to display the symbols determined by the determination unit. Furthermore, in the event that the determination unit has determined that a predetermined payout prize from amongst a plurality of predetermined prizes has been won, credit will be paid out in an amount that corresponds to the predetermined payout prize. This type of video slot machine is similar to those disclosed in U.S. Pat. No. 6,641,477 and U.S. Pat. No. 6,731,313.

Generally, depending on the type thereof, a video slot machine will pay a large dividend at a low prize winning ratio, or will pay a small dividend at a high prize winning ratio. These features primarily depend on the symbol arrangement on the reel images, such as whether or not there are a large number of high dividend symbols on the reel images, or whether or not the positions of the high dividend symbols on the reel images are variable or fixed. Most conventional video slot machines are configured such that the reel images cannot be changed. Accordingly, it has been difficult to provide a video slot machine having both of these contradictory features.

In contrast, the video slot machines disclosed in U.S. Pat. No. 6,641,477 and U.S. Pat. No. 6,731,313 have a configuration that will allow a player to change some of the symbols on the reel images. In this type of video slot machine, only some of the symbols on the reel images can be changed by a player. Consequently, a player cannot make significant changes to the original features of this type of video slot machine. Thus, the aforementioned problem has yet to be solved.

In addition, the video slot machines disclosed in U.S. Pat. No. 6,641,477 and U.S. Pat. No. 6,731,313 require the player to change the symbols on the reel images. Typically, regular players, such as those who play video slot games for a long period of time or many times, prefer to play games that require as few operations as possible. Accordingly, regular players find video slot machines that require an operation from a player each time the symbols on the reel images are to be changed annoying, and this will cause game performance to decline.

In view of the above, it will be apparent to those skilled in the art from this disclosure that there exists a need for an improved video slot machine that can execute a video slot game having at least two features that contradict each other, depending on the symbol arrangement, but will not annoy a player. This invention addresses this need in the art as well as other needs, which will become apparent to those skilled in the art from this disclosure.

SUMMARY OF THE INVENTION

A first aspect of the present invention provides a video slot machine in which a plurality of reel images comprising at least two types of arranged symbols are displayed on a monitor. The video slot machine comprises a game controller configured to control a game comprising one or more unit games in response to a BET operation; a display controller configured to control the monitor such that the symbols of the reel images are successively changed and then stopped for display during the unit game; a change time determination unit configured to determine whether or not it is time to change the reel images; and a reel image changing unit configured to change at least one of the plurality of reel images to a different reel image having a different symbol arrangement when the change timing determination unit determines that it is time to change the reel images.

In this video slot machine, if it is determined that a predetermined change time has been reached, at least one of reel images displayed on the monitor will be changed to a different reel image having a different symbol arrangement. The change in the reel image makes it possible to change the probability of winning a high dividend prize and a low dividend prize. For example, the prize winning ratio can be changed in order to change the game performance, e.g., the probability of winning a low dividend prize will be high with the reel images before the change and the probability of winning a high dividend prize is high with the reel images after the change. However, the dividend paying ratio will be set to be constant before and after the change in the reel images. For example, although the payout ratio will change between when the probability of winning a low dividend prize is high and when the probability of winning a high dividend is high, the payout ratio will be set to be constant on average.

Furthermore, according to the present video slot machine, since the reel image itself is exchanged and not some of the symbols on the reel image, it is possible to change the symbol arrangement of the reel image to a large extent, thereby changing the game performance dramatically. Accordingly, a player can enjoy games having significantly different game performance with a single video slot machine. In addition, in the present video slot machine, the reel image changing unit will change the reel image if the predetermined change time has been reached, without an operation from a player. Consequently, a player will not become annoyed.

Note that the "change time" will be set at the point at which appropriate conditions have been satisfied, excluding an operation from a player. The appropriate conditions include, for example, a condition in which a predetermined time of day has arrived, or a condition in which a predetermined period has elapsed since a point in time. This point in time may include the point at which a player starts to play a game or the point in time at which the previous reel image was changed. In addition, the predetermined period is a period longer than the time needed to execute one unit game, and can be defined by time, the number of unit games, or the number of times a specific prize has been won.

According to a second aspect of the present invention, in the first aspect, there will be a greater number of symbols that will win a low dividend prize, or there will be a greater number of symbols that will win a high dividend prize, in the plurality of reel images after the at least one reel image has been changed.

For example, the reel image before the change will include a larger number of symbols for winning a low dividend prize, and the reel image after the change will include a larger number of symbols for winning a high dividend prize. Here, winning a low dividend prize means winning a prize in which a small amount of credit can be obtained, and winning a high dividend prize means winning a prize in which a large amount of credit can be obtained. As a result, if the reel image before the change is used, a game will be provided in which the amount of credit obtained when one prize is won will be small but the prize winning ratio will be high. In contrast, if the reel image after the change is used, a game will be provided in which the amount of credit obtained when one prize is won will be large but the prize winning ratio will be low. Accordingly, a video slot game having at least two contradictory features can be realized with a single slot machine.

According to a third aspect of the present invention, in the first aspect, a video slot machine further comprises a determination unit configured to determine the symbol to be stopped for each of the reel images in response to the BET operation. In addition, the reel image changing unit will change the at least one reel image between the point at which a unit game is completed and the point at which the determination unit determines the symbols to be stopped in the next unit game.

In the event that the prize winning determination unit determines that a prize has not been won, the term "after the completion of a unit game" means after that determination has been made. In contrast, in the event that the prize winning determination unit determines that a prize has been won, the term "after the completion of a unit game" means after the completion of a process associated with that prize. For example, in the event that the prize winning determination unit determines that a payout prize has been won, this term will mean after the completion of the payout process by the payout process unit.

According to the present invention, by changing a reel image before the symbols to be stopped in the next unit game have been determined, the symbols to be stopped in the next unit game can be determined based upon a new reel image.

According to a fourth aspect of the present invention, in the first aspect, the display controller is configured to display the timing of the change to the at least one reel image on the monitor.

In this video slot machine, since a player will be notified of the timing at which the reel images will be changed, the player can know in advance when the reel image changing unit will change the reel image. Consequently, when the change timing approaches, the player can play a game and expect a change in the reel images.

According to a fifth aspect of the present invention, in the first aspect, the reel image changing unit will replace all of the plurality of reel images displayed on the monitor with a plurality of other reel images having different symbol arrangements.

Since all of the reel images will be changed to other reel images when a predetermined change time is reached, it will be possible to more significant changes to the game performance.

According to a sixth aspect of the present invention, in the first aspect, the reel image changing unit will replace at least two of reel images displayed on the monitor with reel images having different symbol arrangements.

In the video slot machine, the reel images will be changed by replacing at least two reel images with reel images having different symbol arrangements. Since existing reel images will be exchanged in order to change the reel images, the number of reel images that must be prepared in advance can be reduced.

According to a seventh aspect of the present invention, in the first aspect, the video slot machine further comprises a prize winning determination table configured to store the relationships between combinations of symbols to be stopped for display and a plurality of prizes; and a prize winning determination unit configured to determine whether or not a prize has been won in accordance with the combinations of the symbols to be stopped for display and the prize winning determination table. In the prize winning determination table, one or more of the prizes will be deleted, or a new prize will be added, in conjunction with the change in the at least one reel image performed by the reel image changing unit.

In this video slot machine, not only will a reel image be changed, but also the number or type of prizes to be won will be changed. As a result, it will be possible to significantly change at least two contradictory features, depending on the symbol arrangement, before and after a change to the reel images.

According to an eighth aspect of the present invention, in the seventh aspect, the reel images after the change will include a new symbol that was not included in the reel images before the change, and a new prize corresponding to the new symbol will be added in the prize winning determination table.

Since the reel images after the change will include a new symbol, it will be possible to provide a player with a fresh game, and to improve the player's interest in the game. In addition, the player can also enjoy the new prize.

According to a ninth aspect of the present invention, in the first aspect, a predetermined payout ratio will be constant before and after the change to the at least one reel image by performing the reel image changing unit.

If the determination process by the prize winning determination unit is the same both before and after the change to the reel images, the prize winning ratio determined by the combination of the symbols may be changed, and thus the amount of credit that can be obtained by a player may be changed to a large extent. For example, if the probability of winning a low dividend prize is high and the amount of credit that can be obtained is small before the change to the reel images, and the probability of winning a high dividend prize is high and the amount of credit that can be obtained is high after the change to the reel images, there will be a significant difference in the amount of credit that can be obtained before and after the change to the reel images. In other words, the predetermined payout ratio may significantly change before and after the change to the reel images. For example, if the predetermined payout ratio is significantly changed each time the reel images are changed, problems such as a feeling of unfairness will occur between a player who plays mainly before the change to the reel images and a player who plays mainly after the change to the reel images.

Therefore, in the game device according to the present invention, the predetermined payout ratio is kept constant before and after the change to the reel images. As a result, the predetermined payout ratio will not be changed to a large extent each time the reel images are changed, and thus players can be provided with a sense of fairness.

It should be noted that the word "constant" here does not mean "constant" in a strict sense, but rather means within a predetermined allowable range.

According to a tenth aspect of the present invention, in the first aspect, the video slot machine further comprises a change timing changing unit configured to change the timing of the change to the at least one reel image.

In this video slot machine, by changing the timing at which the reel image is to be changed, it will be possible to make the change timing unpredictable, and to improve the game performance associated with the change to the reel images. As a result, it will be possible to improve a player's interest in the game.

According to an eleventh aspect of the present invention, in the tenth aspect, a video slot machine further comprises a receiving unit configured to receive the change in the timing from a player. In addition, the change timing changing unit will change the timing of the change to the at least one reel unit to the timing received from the player.

In this video slot machine, since the player can decide the timing at which the reel image will be changed, it will be possible to change the timing at which the reel images will be changed in accordance with a player's desire.

According to a twelfth aspect of the present invention, in the tenth aspect, the video slot machine further comprises a change timing lottery unit configured to determine the timing of the change of the at least one reel unit by lottery. In addition, the change timing changing unit will change the timing of the change to the at least one reel unit to the timing determined by the change timing lottery unit.

In this video slot machine, since the change timing will be determined by lottery, a player cannot decide the timing at which the reel images will be changed. As a result, it will be possible to make the timing at which the reel image will be changed unpredictable.

According to a thirteenth aspect of the present invention, a control method is provided for controlling a video slot machine in which a plurality of reel images comprising at least two types of arranged symbols are displayed on a monitor. The control method comprises the steps of controlling a game comprising one or more unit games in response to a BET operation; controlling the monitor such that the symbols of the reel images are successively changed and then stopped for display in the unit game; determining whether or not it is time to change the reel images; and changing at least one of the reel images to a different reel image having a different symbol arrangement when it is determined that it is time to change the reel images.

According to a fourteenth aspect of the present invention, a control program is provided for a video slot machine in which a plurality of reel images comprising at least two types of arranged symbols are displayed on a monitor. The control program comprises code which will cause a video slot machine to function as a game controller configured to control a game comprising one or more unit games in response to a BET operation; a display controller configured to control the monitor such that the symbols of the reel images are successively changed and then stopped for display in the unit game; a change time determination unit configured to determine whether or not it is time to change the reel images; and a reel image changing unit configured to change at least one of the reel images to a different reel image having a different symbol arrangement when the change timing determination unit determines that it is time to change the reel images.

According to a fifteenth aspect of the present invention, a computer readable storage medium is provided that stores a control program that will be executed by a video slot machine in which a plurality of reel images comprising at least two types of arranged symbols are displayed on a monitor. The control program will execute the steps of controlling a game comprising one or more unit games in response to a BET operation; controlling the monitor such that the symbols of the reel images are successively changed and then stopped for display in the unit game; determining whether or not it is time to change the reel images; and changing at least one of the reel images to a different reel image having a different symbol arrangement when it is determined that it is time to change the reel images.

As described above, according to any of the first through fifteenth aspects of the present invention, it will be possible to execute a video slot game having at least two contradictory features, depending upon the symbol arrangement.

In addition, according to the fourth aspect of the present invention, it will be possible for a player to know when a reel image has been changed by the reel image changing unit.

According to the fifth aspect of the present invention, since the symbol arrangement of a reel image can be changed to a large extent, it will be possible to more easily execute a video slot game having at least two contradictory features, depending on the symbol arrangement, with a single slot machine.

According to the sixth aspect of the present invention, the number of the reel images that must be prepared can be reduced.

According to the seventh aspect of the present invention, it will be possible to make significant changes to at least two contradictory features of a video slot game, depending on the symbol arrangement, before and after the change in the reel images.

According to the eighth aspect of the present invention, since the reel images after the change will include a new symbol, it is possible to provide a player with a fresh game and improve the player's interest in the game.

According to the ninth aspect of the present invention, since the predetermined payout ratio is kept constant even if the reel images are changed, it will be possible to prevent problems from occurring due to a large change in the predetermined payout ratio.

According to the tenth aspect of the present invention, since the timing at which the reel image will be changed can be changed, it will be possible to prevent the game performance associated with the change in the reel images from becoming monotonous.

According to the eleventh aspect of the present invention, it will be possible to change the timing at which the reel image will be changed to the timing desired by a player.

According to the twelfth aspect of the present invention, it will be possible to make the timing at which the reel images are changed unpredictable, and to improve the game performance in accordance with the change in the reel images.

These and other objects, features, aspects and advantages of the present invention will become apparent to those skilled in the art from the following detailed description, which, taken in conjunction with the annexed drawings, discloses a preferred embodiment of the present invention.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

An embodiment of the present invention that is applied to a video slot machine (a game device) installed in a casino will be described below.

First, the basic structure of the slot machine according to the present embodiment will be described.

Figure 2:
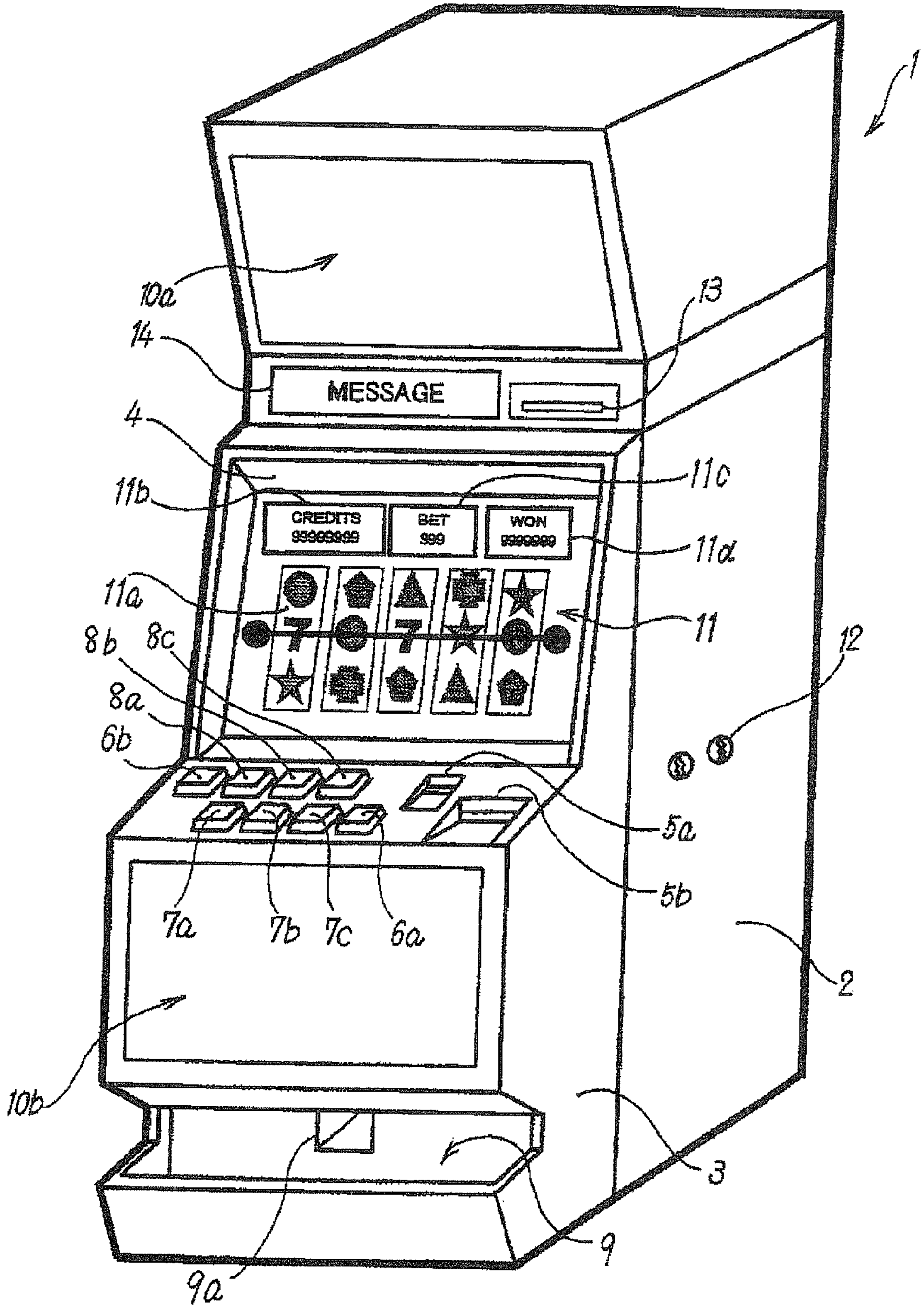
FIG. 2 is an external perspective view of a slot machine.

FIG. 2 is an external perspective view of a slot machine according to the present embodiment. A slot machine 1 comprises a box-shaped housing 2, and a front panel 3 that can freely open and close and is attached to the front side of the housing 2. The front panel 3 comprises a display window 4 in which a monitor 11 is arranged to be visible from the exterior; a coin insertion slot 5*a* and a bill insertion slot 5*b* constituting currency receiving units; a spin button 6*a*; a credit return button 6*b*; various BET buttons 7*a*, 7*b*, 7*c*, 8*a*, 8*b* and 8*c*; a coin receiver 9 having a coin delivery port 9*a*; and various lamps 10*a* and 10*b*. The spin button 6*a*, the credit return button 6*b*, and the various BET buttons 7*a*, 7*b*, 7*c*, 8*a*, 8*b* and 8*c* are lamp buttons equipped with light emitters. It should be noted that although the various operation buttons such as the spin button 6*a* are mechanical buttons in the present embodiment, a touch panel may be provided on the monitor 11 in order to display button images on the monitor 11 corresponding to various operation buttons such as the spin button 6*a*.

The monitor 11 (display unit) is provided inside the slot machine 1. The monitor 11 displays at least two different kinds of symbols arranged in a predetermined order in each of the five symbol display areas 11*a*. The monitor 11 is comprised of a liquid crystal display, but may be comprised of another type of display, such as a CRT monitor, a plasma display and the like. Displayed in a location on the monitor 11, above the five symbol display areas 11*a*, are a credit display 11*b* for displaying the amount of credit corresponding to the amount of money inserted by a player by way of the coin insertion slot 5*a* or the bill insertion slot 5*b*; a BET display 11*c* for displaying the amount of credit that a player placed in a bet by operation of the BET buttons 7*a*, 7*b*, 7*c*, 8*a*, 8*b*, and 8*c*; and an acquired credit display lid for displaying the amount of credit won by the player as a result of the game. Built into the slot machine 1 are an inspection device for confirming whether or not the accepted coins or bills are genuine, a coin refund device (not shown in the figure) having a hopper capable of receiving a large number of coins, a speaker serving as a sound output unit, and a main controller and a sub-controller that have electronic circuits formed by electronic components such as a CPU, ROM, and the like.

A reset switch 12 is arranged on a side surface of the slot machine 1. The reset switch 12 has a keyhole that corresponds to a special key that is possessed by a casino attendant located where the slot machine 1 is installed. The reset switch 12 is operated by inserting the special key into the keyhole. Thus, a player cannot operate the reset switch 12.

A card insertion slot 13 and a display device 14 are arranged in an upper portion of the slot machine 1. The card insertion slot 13 enables the insertion of a house card that serves as a portable recording medium to be used in a casino. The house card is used for managing personal information about a player who is registered at a casino, and stores a player ID as player identification information (identification information that is different for each player). A casino management device associates the player IDs with each player, and manages personal information about each player. The house card is used by the management device to, for example, manage the points corresponding to the amount of credit and the like that was spent by a player in a game. In this way, services such as complimentary hotel rooms and the like can be provided to a player in response to the number of points he or she has. In addition, the number of points a player has will be displayed on the display device 14. In the present embodiment, a player can also deposit cash in advance in the casino and use the house card to use the previously deposited cash to play games on the slot machine 1. This will be described in greater detail later.

Figure 3:
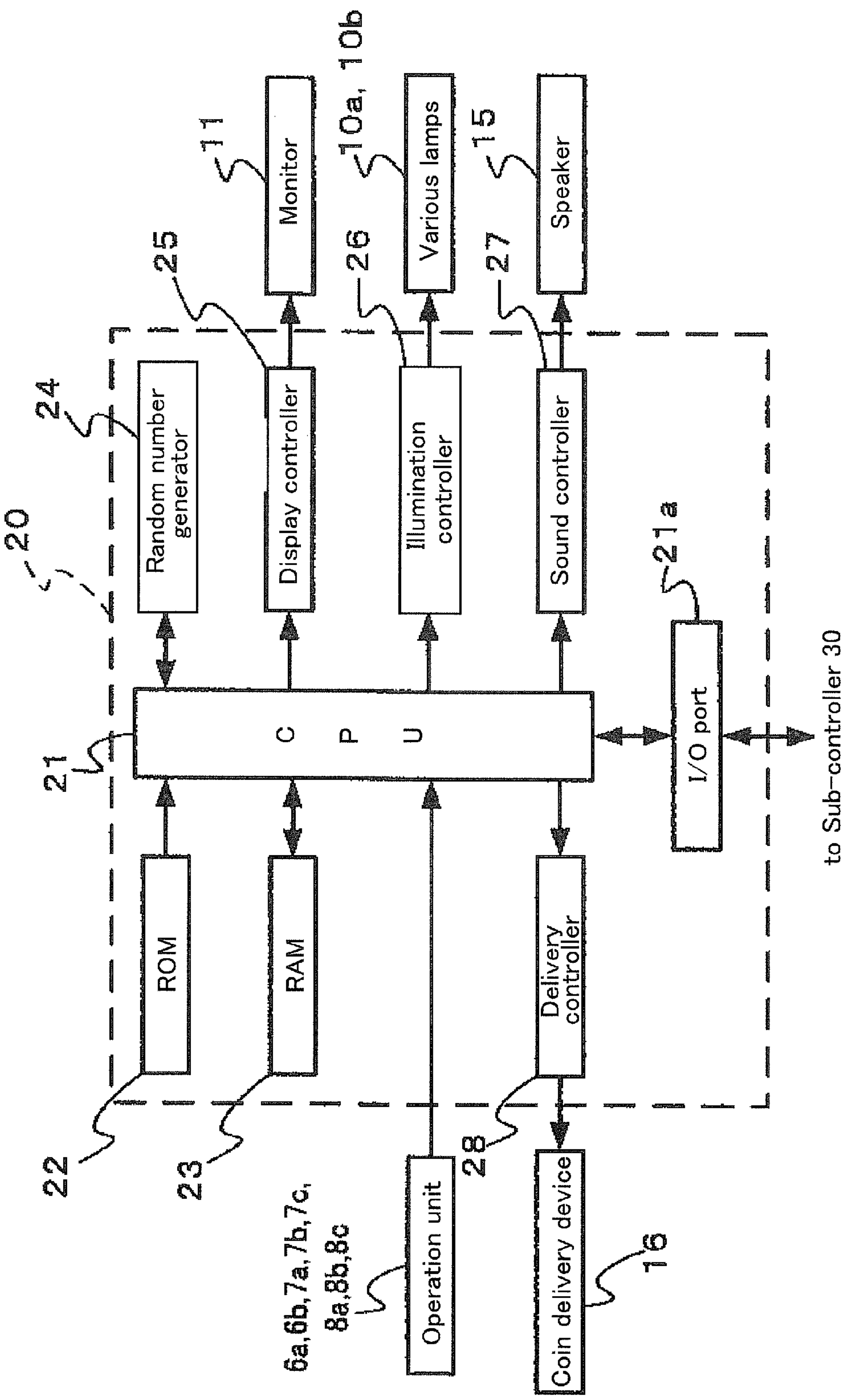
FIG. 3 is a block diagram of the hardware configuration of a main controller in the slot machine.

FIG. 3 is a block diagram schematically showing the configuration of a main controller that is comprised of control units of the slot machine 1.

Figure 4:
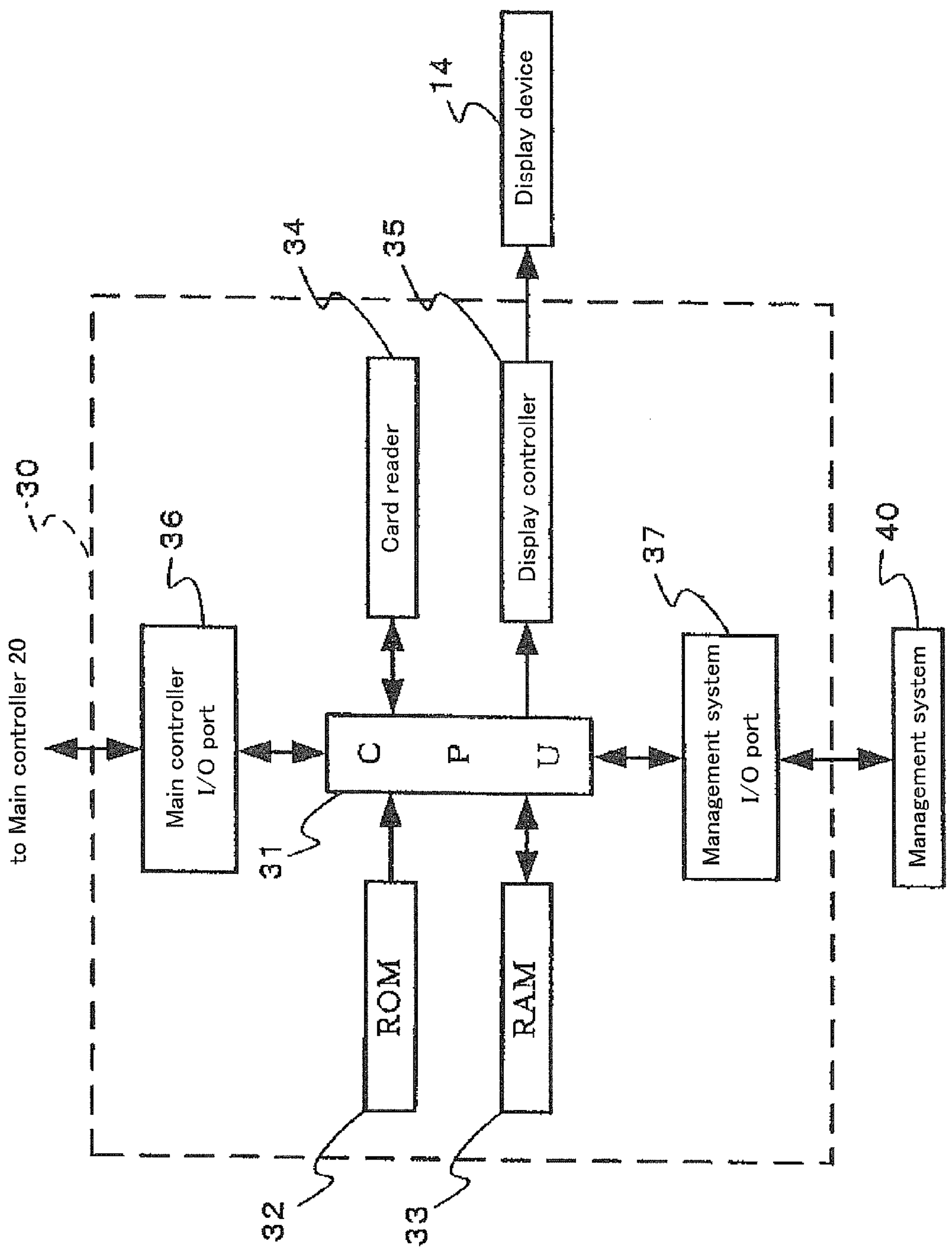
FIG. 4 is a block diagram of the hardware configuration of a sub-controller in the slot machine.

FIG. 4 is a block diagram schematically showing the configuration of a sub-controller that is comprised of control units of the slot machine 1.

A main controller 20 comprises a CPU 21, an I/O port 21*a*, ROM 22, RAM 23, a random number generator 24, a display controller 25, an illumination controller 26, a sound controller 27, a refund controller 28, and the like. The I/O port 21*a* is used for data communication with a sub-controller 30. The ROM 22 stores data to be utilized by the CPU 21, such as various programs and databases, and outputs the data to the CPU 21. The RAM 23 temporarily stores variable-number data computed by the CPU 21. The random number generator 24 generates a random number periodically and outputs the data to the CPU 21. The display controller 25 and the monitor 11 comprise the display unit. Under the control of the CPU 21, the display control unit 25 controls the display operation of the monitor 11, which displays the symbol display areas 11*a* and the like. The illumination controller 26 controls the illumination of the lamps 10*a* and 10*b*, under the control of the CPU 21. The sound controller 27 will control voice announcements and sound effects and the like that are output from a speaker 15, and is under the control of the CPU 21. The refund controller 28 controls a coin refund device 16 that serves as a payout provider for refunding coins from the coin delivery port 9*a* to the coin receiver 9, and is under the control of the CPU 21.

The CPU 21 of the main controller 20 is connected to an operation unit that comprises the spin button 6*a* for executing the start operation, the credit return button 6*b*, and various BET buttons 7*a*, 7*b*, 7*c*, 8*a*, 8*b*, and 8*c* for executing BET operation by which a player indicates the amount of credits to be placed in a bet in order to obtain permission to play the game. The CPU 21 is also connected to a currency counting device (not shown in the figure) that will count the money input into the coin insertion slot 5*a* and the bill insertion slot 5*b*.

The sub-controller 30 comprises a CPU 31, ROM 32, RAM 33, a card reader 34, a display controller 35, a main controller I/O port 36, a management system I/O port 37, and the like. The ROM 32 stores data to be utilized by the CPU 31, such as various programs and databases, and outputs the data to the CPU 31. The RAM 33 temporarily stores variable-number data computed by the CPU 31. The card reader 34 reads a player ID that is recorded in a house card inserted by way of the card insertion slot 13, and outputs the player ID to the CPU 31. The display controller 35 controls the display operation of the display device 14, under the control of the CPU 31. The main controller I/O port 36 is used to perform data communication with the main controller 20. In addition, the management system I/O port 37 is used to perform data communication with a management system 40 that collectively manages a plurality of game devices installed in a casino. In the present embodiment, the management system 40 stores credit data corresponding to the amount of cash that a player has previously deposited in the casino in association with the player ID of the player.

Next, the operation of individual units in accordance with the flow of a game executed by the slot machine 1 will be described below. When a player performs a credit input operation, such as inserting coins into the coin insertion slot 5*a* or inserting bills into the bill insertion slot 5*b*, an inserted amount counter (not shown) will count the coins or bills. The currency counting device outputs the inserted currency data to the CPU 21 of the main controller 20. The CPU 21, after receiving the inserted currency data, stores credit data indicating the amount of credit corresponding to the inserted currency data into the RAM 23. In addition, if credits that were previously deposited in the casino are withdrawn in order to be used in a credit paying process, the credit data thereof will be stored in the RAM 23.

The credit withdrawal process will now be described more in detail. First, when a player deposits cash at the reception disk in a casino, credit data corresponding to the amount of cash deposited is associated with the player ID of the player, and registered in the database in the management system 40. Then, when the player wishes to use the registered credit data to play a game in the slot machine 1, he or she will first insert a house card in which his or her player ID has been recorded therein into the card insertion slot 13. The card reader 34 of the sub-controller 30 reads the player ID recorded in the inserted house card, and transmits the player ID to the CPU 31 of the sub-controller 30. If the CPU 31 receives the player ID from the card reader 34, the CPU 31 determines whether or not the player ID is valid. Although this determination is made by the controller of the slot machine 1 in this embodiment, this may be executed by the management system 40. In that case, after receiving the player ID, the CPU 31 sends it to the management system 40, and receives a determination result performed by the management system 40 as a response.

If it is determined that the player ID is not valid, the CPU 31 will send a notice to the CPU 21 of the main controller 20. After receiving the notice, the CPU 21 of the main controller 20 will control the display controller 25 in order to display an error message on the monitor 11. The CPU 31, having determined that the player ID is not valid, will send a card eject signal to the card reader 34 in order to eject the house card. In contrast, if the player ID is determined to be valid, the CPU 31 will send a credit data acquisition request relating to the player ID received from the card reader 34, through the management system I/O port 37 to the management system 40. The management system 40, in response to the acquisition request, will read the credit data from the database in association with the player ID, and send it to the management system I/O port 37 of the sub-controller 30 in the slot machine 1. The credit data that is received by the management system I/O port 37 will be sent to the CPU 31 of the sub-controller 30, and the CPU 31 will send the credit data to the CPU 21 of the main controller 20. Then, the CPU 21 will store the received credit data temporarily in the RAM 23 in order to allow the credit to be used in a game in the slot machine 1. As a result, convenience for players is improved because a player can engage in a game in the slot machine 1 without carrying cash.

Figure 1:
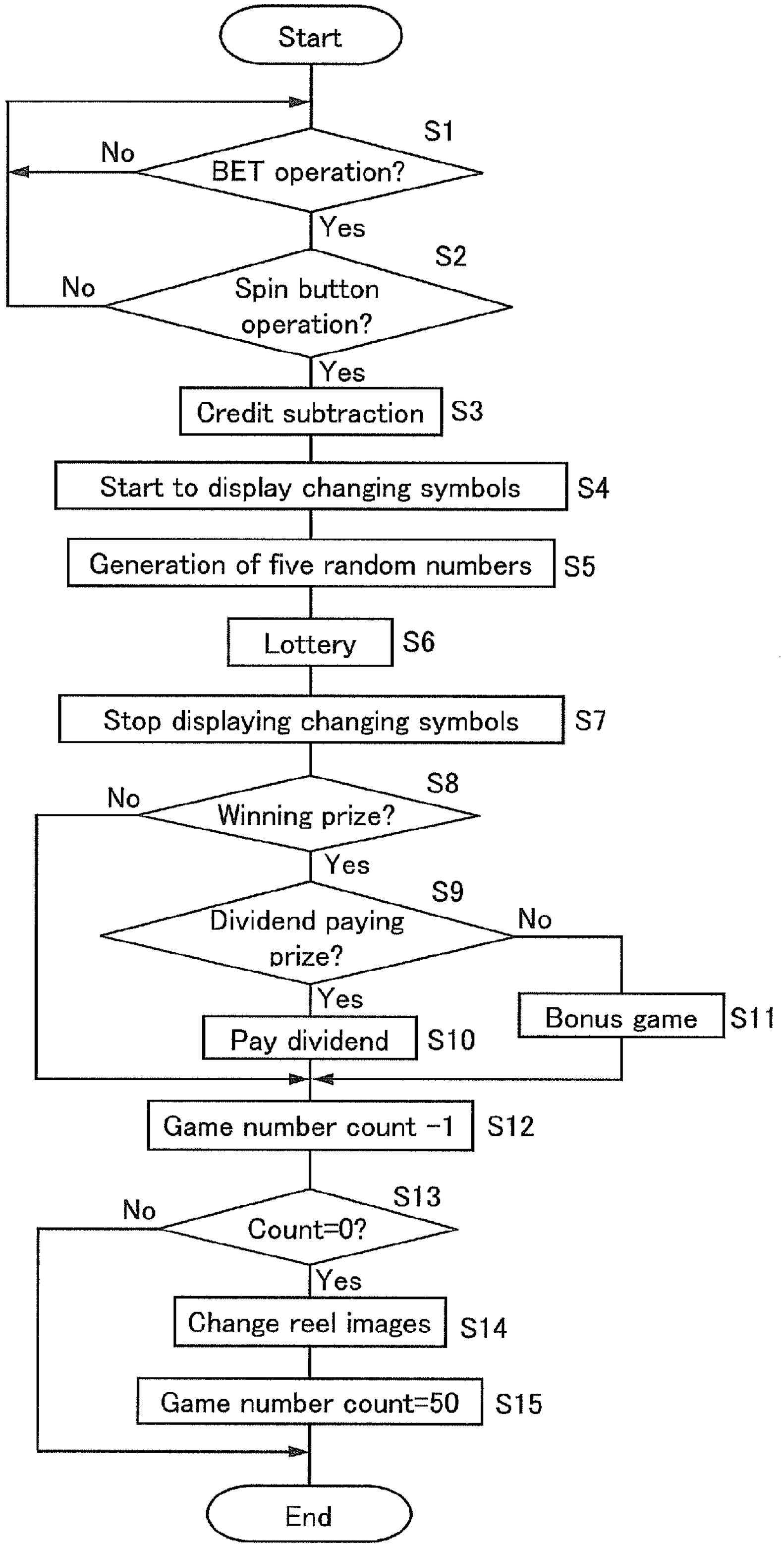
FIG. 1 is a flowchart showing the progression of a game in a slot machine according to one embodiment of the present invention.

FIG. 1 is a flowchart showing the progression of a game in a slot machine according to one embodiment of the present invention.

A player will select one or more desired bet lines, i.e. the top, middle, or bottom bet lines in this case, and further select the amount of credits to be placed in a bet for the bet line(s) selected, by operating the BET buttons 7*a*, 7*b*, and 7*c* and the bet line selecting buttons 8*a*, 8*b*, and 8*c* (S1). In the slot machine 1, one to three bet lines can be selected by operating the bet line selecting buttons 8*a*, 8*b* and 8*c*, and the amount of credits (1-3 credits) to be placed in a bet for the selected bet lines can be selected by operating the BET buttons 7*a*, 7*b* and 7*c*. The operations executed are sent as BET operation signals to the CPU 21 of the main controller 20. After that, the CPU 21 will be in a state in which the CPU 21 can receive operation signals from the spin button 6*a*, so that the operation of the spin button 6*a* by a player will be effective.

When the player operates the spin button 6*a* (S2), the CPU 21 of the main controller 20 serves as a credit process unit, and executes a BET process in which the credits in the RAM 23 are reduced by an amount of credit that corresponds to the operation performed by the player and sent as the BET operation signal, i.e., an amount derived from multiplying the number of bet lines selected by the amount of credits placed in a bet (S3). For example, if three bet lines are selected and two credits are selected as the amount of credits placed in a bet, then the amount bet in one game is six credits. After that, the CPU 21 serves as a start signal generator, and will generate and send start signals to the display controller 25. The display controller 25 will receive the start signals, and control a display operation in which the symbols are successively changed and displayed on each of the symbol display areas 11*a* in the monitor 11 (S4). Here, the changing display of the symbols is performed by successively displaying each of the symbols comprising the reel images. The reel images are displayed on the symbol display areas of the monitor 11, and comprise at least two kinds of symbols that are arranged in a predetermined order. The monitor 11 of the present embodiment has five symbol display areas 11*a*, and the reel images are set to correspond to the symbol display areas, respectively.

The CPU 21 will also send the generated start signal to the random number generator 24. The random number generator 24, after receiving the start signal, will generate five random numbers (S5) and send them to the CPU 21. The random numbers are generated for each of the symbol display areas 11*a* displayed on the monitor 11. The CPU 21 and the random number generator 24 function as a determination unit, and the CPU 21 will compare the random numbers with stop position tables that are stored in the ROM 22 after receiving the five random numbers sent from the random number generator 24. A stop position table is prepared for each of the reel images of the symbol display areas 11*a*. In other words, one stop position table in which each image comprising a reel image are matched with random number values is prepared for each of the reel images. Each of the random numbers and each of the stop position tables determine the stop positions of each of the changing displays in the symbol display area 11*a*. In other words, the five random numbers sent from the random number generator 24 determine the symbols that will be finally displayed in the symbol display areas 11*a*.

In contrast, the CPU 21 functions as a prize winning determination unit together with the random number generator 24, and will receive five random numbers sent from the random number generator 24. Then, the prize winning determination unit will perform a lottery process in which it will be determined whether or not a combination of the random numbers will win a predetermined prize by comparing them with a prize winning determination table stored in the ROM 22 (S6). The prizes are broadly categorized into a prize (dividend paying prize) which pays an amount of credit corresponding to the prize to a player, and a prize (bonus feature) which allows a player to execute an event or a special game such as a free game, a feature game, or the like. The CPU 21 will determine whether or not a prize has been won in a game, and the type of prize won, by using the combination of the random numbers and the prize determination tables. The ROM 22 stores at least two kinds of prize determination tables, such as a prize determination table used for an ordinary game and a prize determination table used for a special game. In the prize determination table for an ordinary game, individual prize determination tables are prepared for each of the bet lines that are selectable with the bet line selecting buttons 8*a*, 8*b* and 8*c*.

After the lottery process, the CPU 21 will control the display controller 25 in order to stop the changing displays in the symbol display areas 11*a* at the determined stop positions (S7). Accordingly, the changing displays will be stopped at the determined stop positions in the symbol display areas 11*a* of the monitor 11, and predetermined symbols corresponding to the five random numbers will be stopped and displayed in the symbol display areas 11*a*.

If it is determined that the dividend paying prize has been won in the lottery process (S8, S9), the CPU 21 of the main controller 20 will output, after the changing displays in the symbol display areas 11*a* are stopped and symbols are displayed thereon, predetermined effect signals to the illumination controller 26 and the sound controller 27. As a result, the illumination controller 26 will control an illumination operation, such that the lamps 10*a* and 10*b* and the lamp buttons comprised of light emitting means such as the BET buttons 7*a*, 7*b*, 7*c*, 8*a*, 8*b*, and 8*c* will flash in a flashing pattern in response to the effect signals. In addition, the sound controller 27 will execute a control operation in order to temporarily stop playing the music output as sound effects from the speaker 15, and output a sound effect in response to the effect signals from the speaker 15. Then, as a delivery process unit, the CPU 21 will execute a delivery process in which the amount of credit in accordance with the prize that was won will be added to the credit data stored in the RAM 23 (S10).

In addition, if it is determined that a bonus feature has been won in the lottery process (S8, S9), the CPU 21 of the main controller 20 will output, after the changing displays in the symbol display areas 11*a* are stopped and symbols are displayed thereon, predetermined effect signals to the illumination controller 26 and the sound controller 27. Accordingly, the illumination controller 26 will execute an illumination control in which various lamp buttons are lighted to illuminate in a flashing pattern corresponding to the effect signals. In addition, the sound controller 27 will temporarily stop the speaker 15 from outputting the music, and control the speaker 15 so as to output different music that corresponds to the effect signals. Then, the game control style of the CPU 21 will shift from an ordinary game control style to a bonus feature control style in order to control an event or a bonus game in accordance with the prize won, and will then proceed to the bonus game of the bonus feature (S11). After that, in the present embodiment, a process of changing the reel images will be performed (S12 to S15).

Next, the process of changing the reel images will be described.

In the present embodiment, the process of changing the reel images will be performed when it is determined that no prize has been won, when a dividend payout has been completed after a dividend paying prize has been won, or when a bonus game has been completed after a bonus feature has been won (hereinafter, these events will be referred to as "when a game has been completed"). Note that although the process of changing the reel images will be performed immediately after the end of a game in the present embodiment, this process may be performed at any point from the completion of a game to the point at which the symbols to be stopped and displayed on the monitor 11 are determined in the next game. Preferably, the process of changing the reel images is performed at any point from the completion of a game to the point at which the symbols begin to rotate in the symbol display areas 11*a*.

In the present embodiment, the reel images will be changed every fifty games. More specifically, in the present embodiment, the RAM 23 of the main controller 20 will store game number count data. Note that the initial vale of the game number count data is fifty. The CPU 21 of the main controller 20 will, after the completion of a game, subtract one from the count value of the game number count data in the RAM 23 (S12). After that, the CPU 21 will determine whether or not the game number count data in the RAM 23 is zero (S13). In this determination, if it is determined that the game number count data is not zero, the CPU 21 will prepare for the next game. In contrast, if it is determined that the game number count data is zero in this determination, the CPU 21 will determine that a predetermined change time has been reached, will change the reel images (S14), and then reset the game number count data to fifty as the initial value (S15).

The change in the reel images will be described in more detail. In the present embodiment, the reel image recording unit installed in the display controller 25 will store image data for six reel images. The display controller 25 will read out five image data from this group of image data, and display five reel images based on this image data on the symbol display areas 11*a* of the monitor 11. In the present embodiment, if we assume that the five symbol display areas 11*a* of the monitor 11 are a first symbol display area, a second symbol display area, a third symbol display area, a fourth symbol display area, and a fifth symbol display area in this order from the left, the reel image to be displayed on the third symbol display area, which is located in the center, will be changed. More specifically, if the CPU 21 determines that the game number count data has reached fifty, it will output a reel image change command to the display controller 25. After receiving this command, the display controller 25 will read out the one remaining image data that is not one of the five reel images currently being displayed on the symbol display areas from the reel image recording unit. Then, in place of the reel image that was previously displayed in the third symbol display area (hereinafter referred to as "reel image A"), the read out image data will displayed on the third symbol display area of the monitor 11 as post-change image data (hereinafter referred to as "reel image B"). As a result, in the next game or thereafter, the reel image B will be displayed on the third symbol display area while the video slot game is executed.

If the CPU 21 has determined that the game number count data is fifty, it will also change the stop position table to be used for the third symbol display area to one corresponding to the reel image B. In the other words, the stop position table corresponding to the reel image A will be changed to a stop position table in which the images constituting the reel image B are associated with random numbers. Consequently, even after the change to the reel image B, a correspondence can be appropriately maintained between the random numbers generated by the random number generator 24 for the third symbol display area and symbols to be stopped and displayed on the third symbol display area. In addition, the CPU 21 will also change the prize winning determination table used for the prize determination in conjunction with the change to the reel image B. Consequently, a correspondence will be appropriately maintained between the combination of symbols stopped and displayed on the symbol display area 11*a* and the prizes before and after the change to the reel image B. It should be noted that in the present embodiment, the combinations of symbols that will determine whether a prize will be won and what type of prize will be won will be the same before and after the change in the reel images. For example, if it is determined that a prize will be won with the combination "777", the number of sevens that will appear will be increased by changing the reel images, and the number of times that a prize will be won with "777" will be increased. In other words, although the type of prize that will be won with "777" will not change, the prize winning ratio will change.

In the present embodiment, the symbol arrangement on the reel image A is different than that on the reel image B. This includes situations in which the order of the symbols on each reel image is different from each other, the total number of symbols on each reel image is different from each other, and the number of at least one type of symbol on each reel image is different from each other. Note that when the total number of symbols on each reel image is different from each other, the range of the random numbers generated by the random number generator 24 will be changed in accordance with the difference.

Some of the symbols (the low dividend symbols) on the reel image B in the present embodiment will be replaced with high dividend symbols. In other words, the reel image B has the same total number of symbols as the reel image A, but the number of symbols of a specific type (high dividend symbols) in the reel image B is larger than that of the reel image A. Consequently, if the reel image B is used, the prize winning ratio for prizes corresponding to high dividend symbols will be higher than when using the reel image A. In this case, the amount of credit to be paid out when a prize corresponding to high dividend symbols is won will be larger than that when a prize corresponding to low dividend symbols is won. As a result, when the reel image B is used, there is a higher possibility for a player to obtain a large amount of credit at one time compared to when the reel image A is used.

In contrast, the reel image A has a greater number of low dividend symbols and a lower number of high dividend symbols than the reel image B. Consequently, if the reel image A is used, the prize winning ratio for prizes corresponding to low dividend symbols will be higher than when using the reel image B.

As a result, in the present embodiment, if the reel image A is used, a video slot game will be executed in which the prize winning ratio of the prizes corresponding to low dividend symbols is high. In contrast, if the reel image is changed and the reel image B is used, a video slot game will be executed in which the prize winning ratio of the prizes corresponding to high dividend symbols is high. Thus, a game which uses the reel image A, and a game which uses the reel image B, can both be played with a single video slot machine. In addition, the reel image can be changed automatically every fifty games without any operation from a player. Consequently, a player will not become annoyed.

Furthermore, in the present embodiment, the reel image to be displayed on the third symbol display area, which is placed in the center of the five symbol display areas 11*a*, will be changed between the reel image A and the reel image B. In the present embodiment, when the same symbols are stopped and displayed adjacent to each other over at least three adjacent symbol display areas 11*a*, a prize corresponding to the symbols will be won. Since the third symbol display area is positioned in the center of the first to fifth symbol display areas, it is always included in the three or more adjacent areas. In other words, the probability that the third symbol display area will be included in the three or more adjacent areas is higher compared to the other display areas. Accordingly, one will expect that changing the reel image in the third symbol display area will change the prize winning ratio more than when the reel images of the other symbol display areas is changed. As a result, if the reel image displayed in the third symbol display area positioned in the center of the five symbol display areas 11*a* is changed, this change will make it possible to change the features of the video slot machine to a larger extent than when the reel images displayed on the symbol display areas other than the third symbol display area are changed.

In particular, in the present embodiment, the ratio of low dividend symbols that will appear in the reel images displayed in all of the symbol display areas 11*a* will be high. In contrast, the ratio of high dividend symbols that will appear in the reel images displayed in all of the symbol display areas 11*a* will be low. Consequently, the difference between the prize winning ratio of the prizes corresponding to the low dividend symbols when the symbol reel image A is used and the prize winning ratio of the prizes corresponding to the low dividend symbols when the reel image B is used is larger than the difference between the prize winning ratio of the prizes corresponding to the high dividend symbols when the reel image A is used and the prize winning ratio of the prizes corresponding to the high dividend symbols when the reel image B is used. For example, assume that the change from the reel image A to the reel image B decreases the number of the low dividend symbols, and increases the number of high dividend symbols. Further assume that, for example, the prize winning ratio of the prizes corresponding to the low dividend symbols when the reel image A is used is 20/100, and the prize winning ratio of the prizes corresponding to the low dividend symbols when the reel image B is used is 15/100. In contrast, assume that the prize winning ratio of the prizes corresponding to the high dividend symbols when the reel image A is used is 1/100, and the prize winning ratio of the prizes corresponding to the high dividend symbols when the reel image B is used is 6/100. When we consider a situation in which the symbols are matched with each other over the adjacent three display areas, the difference between the prize winning ratio of the prizes corresponding to the low dividend symbols is (20/100)3−(15/100)3=(4625/1000000). In contrast, the difference between the prize winning ratio of the prizes corresponding to the high dividend symbols is (10/100)3−(1/100)3=(99/1000000). Thus, the difference between the prize winning ratio of the prizes corresponding to the low dividend symbols is larger than the difference between the prize winning ratio of the prizes corresponding to the high dividend symbols.

In contrast, the prize winning ratio of the other prizes other than the low dividend symbols and the high dividend symbols are the same for the reel image A and the reel image B. As a result, in the present embodiment, a probability of a loss will be lower when the reel image A is used than when the reel image B is used. For example, if we assume that the reel image A includes three low dividend symbols and one high dividend symbol, the probability of winning with the low dividend symbols and the high dividend symbol is 30/100=3 (10/100) and 1/100, respectively. If we assume the prize winning ratio of the other prizes is 25/100, the probability of a loss will be 44/100. Here, assume that the reel image is changed to B, and there are two low dividend symbols and two high dividend symbols. In this case, the probability of winning with the low dividend symbols and the high dividend symbols is 20/100=2(10/100) and 2/100=2(1/100), respectively. As noted above, since the prize winning ratio of the other prizes will not change from 25/100 even if the reel images are changed, the probability of a loss is 53/100. As a result, the probability of a loss will be lower when the reel image A is used than when the reel image B is used.

Thus, in the present embodiment, when the reel image A is used, a video slot game will be executed in which the amount of credit (dividend) obtained when a prize is won is low but the probability of a loss is also low (the overall prize winning ratio is high). In contrast, in the present embodiment, when the reel image B is used, a video slot game will be executed in which the amount of credit (dividend) obtained when a prize is won is high but the probability of a loss is also high (the overall prize winning ratio is low). Thus, both games can be executed with a single video slot machine.

By appropriately setting the symbol arrangement of the reel images to be displayed on the symbol display areas 11*a*, the predetermined payout ratio in the present video slot machine can be made almost constant before and after the change in the reel images. In some cases, the change in the reel images will change the prize winning ratios of the high dividend symbols or the low dividend symbols so that the amount of credit a player can win will dramatically change. In other words, a change in the reel image may dramatically change the predetermined payout ratio. Therefore, in order to reduce the feeling of unfairness among players due to the change in the reel images, the payout ratio will be kept almost constant even if the reel images are changed.

For example, one way of keeping the predetermined payout ratio almost constant before and after a change in the reel images is to change the amount of credit to be paid out by a dividend paying prize before and after the change in the reel images. In addition, for example, if the reel image A is used, it may add a new prize which is won when the symbols on the adjacent two symbol display areas 11*a* are the same. This method can be utilized not only to keep the predetermined payout ratio almost constant, but also to further reduce the probability of a loss when the reel image A is used. In this way, it will be possible to clarify the differences between the video slot machine before and after the change in the reel images.

Although a situation was described in the present embodiment in which the reel image displayed on the third symbol display area was changed, the reel images to be displayed on the other symbol display areas may also be changed.

Furthermore, although a situation was described in the present embodiment in which the reel image on one symbol display area was changed, the reel images may be changed over at least two symbol display areas. In this case, the timing of the change in the reel images over at least two symbol display areas may be the same as each other or different from each other. If the reel images are set to be changed over all the symbol display areas, it will be possible to clarify the differences in the video slot machine before and after the change in the reel images. Furthermore, when the reel images are to be changed over at least two symbol display areas, the reel images may be exchanged with each other. In this case, only one image data need be stored in the reel image recording unit within the display controller 25 for five reel images.

In addition, the five reel images over all of the symbol display areas 11*a* before and after the change may be defined as one set, and a plurality of sets of the reel images may be stored in the reel image recording unit.

Furthermore, one or more prizes may be deleted in conjunction with the change in the reel images, or one or more new prizes may be added. In this case, one or more of the prizes will be deleted, or one or more new prizes will be added, in the prize winning determination table. Since the number or type of the prizes will be changed as well as the reel images as noted above, the change in the reel images will make it possible to change the game performance. Accordingly, a player can enjoy different types of games or games having contradictory features because of the change in the reel images.

In addition, the reel images after the change may include a new symbol that was not included in the reel images before the change. Then, in the prize winning determination table, a new prize corresponding to the new symbol may be added. Accordingly, different types of game performance or contradictory game performance can be further provided to one game device.

Furthermore, the main controller 20 will function as a notice unit, and display the count value of the game number count data in the RAM 23 on the display device 14. Thus, the CPU 21 of the main controller 20 may provide notice of the point at which the count value reaches zero. More specifically, the CPU 21 of the main controller 20 subtracts one from the count value of the game number count data in the RAM 23 (S12), and then sends the game number count data in the RAM 23 to the sub-controller 30 via the I/O port 21*a*. The CPU 31 of the sub-controller 30 receives the game number count data via the main controller I/O port 36, and then outputs a display command to the display controller 35 in order to display the count value of the game number count data. Accordingly, the display controller 35 will control the display device 14 in order to display the count value. As a result, the remaining number of games before the next change in the reel images will be displayed on the display device 14, so that a player can know when the reel images are to be changed next by seeing the remaining number of games.

Modification 1

Next, a modification (hereinafter referred to as "Modification 1") of the process of changing the reel images in the slot machine of the aforementioned embodiment will be described.

Although the change timing of the reel images is fixed in the aforementioned embodiment, the timing can be changed in Modification 1.

Figure 5:
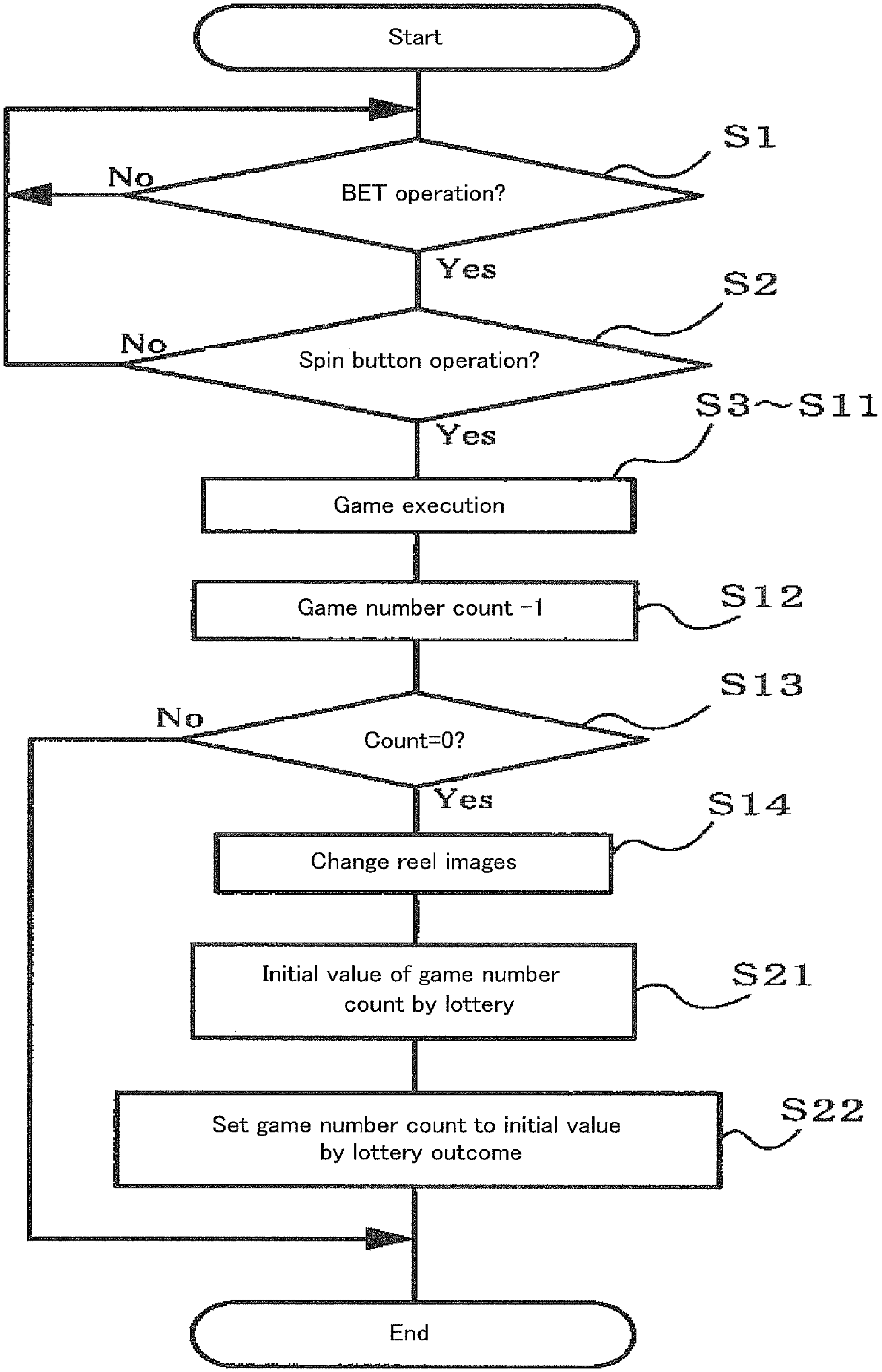
FIG. 5 is a flowchart showing the progression of a game in a slot machine according to one embodiment of the present invention.

FIG. 5 is a flowchart showing the progression of a game in Modification 1. It should be noted that S3 to S11 in this flowchart are the same as the above-described S3 to S11, and thus they are omitted in FIG. 5.

In Modification 1, the CPU 21 of the main controller 20 will, after the completion of a unit game, subtract one from the count value of the game number count data in the RAM 23 (S12) like in the aforementioned embodiment. A unit game is defined as a series of processes that are started by a player placing a bet, and which will continue from the point at which the display of the reel images changes (i.e., begin virtual rotation) until the display of the reels stop (i.e., stop virtual rotation) and the result of the game is displayed. After that, the CPU 21 will determine whether or not the game number count data in the RAM 23 is zero (S13). If it is determined that the game number count data is zero, the CPU 21 will change the reel images (S14).

In Modification 1, after a change in the reel images, the timing of the next change in the reel images will be decided by a lottery. More specifically, the CPU 21 of the main controller 20 will function as a change timing lottery unit, and determine the initial value (the predetermined change timing) of the game number count data by lottery (S21). The lottery will be performed as follows. An initial value determination table, which indicates the relationships between the random numbers and the initial value of the game number count data, is stored in the ROM 22 in advance. After the change in the reel images has been completed, the CPU 21 will receive one random number generated by the random number generator 24, and determine the initial value corresponding to the random number by referring to the initial value determination table in the ROM 22.

After the initial value (predetermined change timing) of the game number count data is determined by lottery as described above, the CPU 21 will function as a change timing changing unit, and set the game number count data in the RAM 23 to the determined initial value (S22). Note that in the present embodiment, the initial value to be determined by lottery will be between 20 and 100 games, but is not limited to this range.

Accordingly, according to Modification 1, after the change to the reel images is completed, the reel image will be changed again after 20 to 100 games. As a result, compared to when the reel image is changed at a fixed timing, the game performance with respect to the change in the reel images will not become monotonous.

In addition, in Modification 1, since the timing at which the reel image will be changed is determined by lottery, a player cannot determine the timing at which the reel images will be changed. Accordingly, a player can expect the reel images to change unpredictably, thereby increasing the game performance with respect to the change in the reel images.

Modification 2

Next, another modification (hereinafter referred to as "Modification 2") of the process of changing the reel images in the slot machine of the aforementioned embodiment will be described.

In Modification 2, as in Modification 1, it will be possible to change the timing at which the reel images will be changed. However, in Modification 2, a player can decide the change timing of the reel images.

Figure 6:
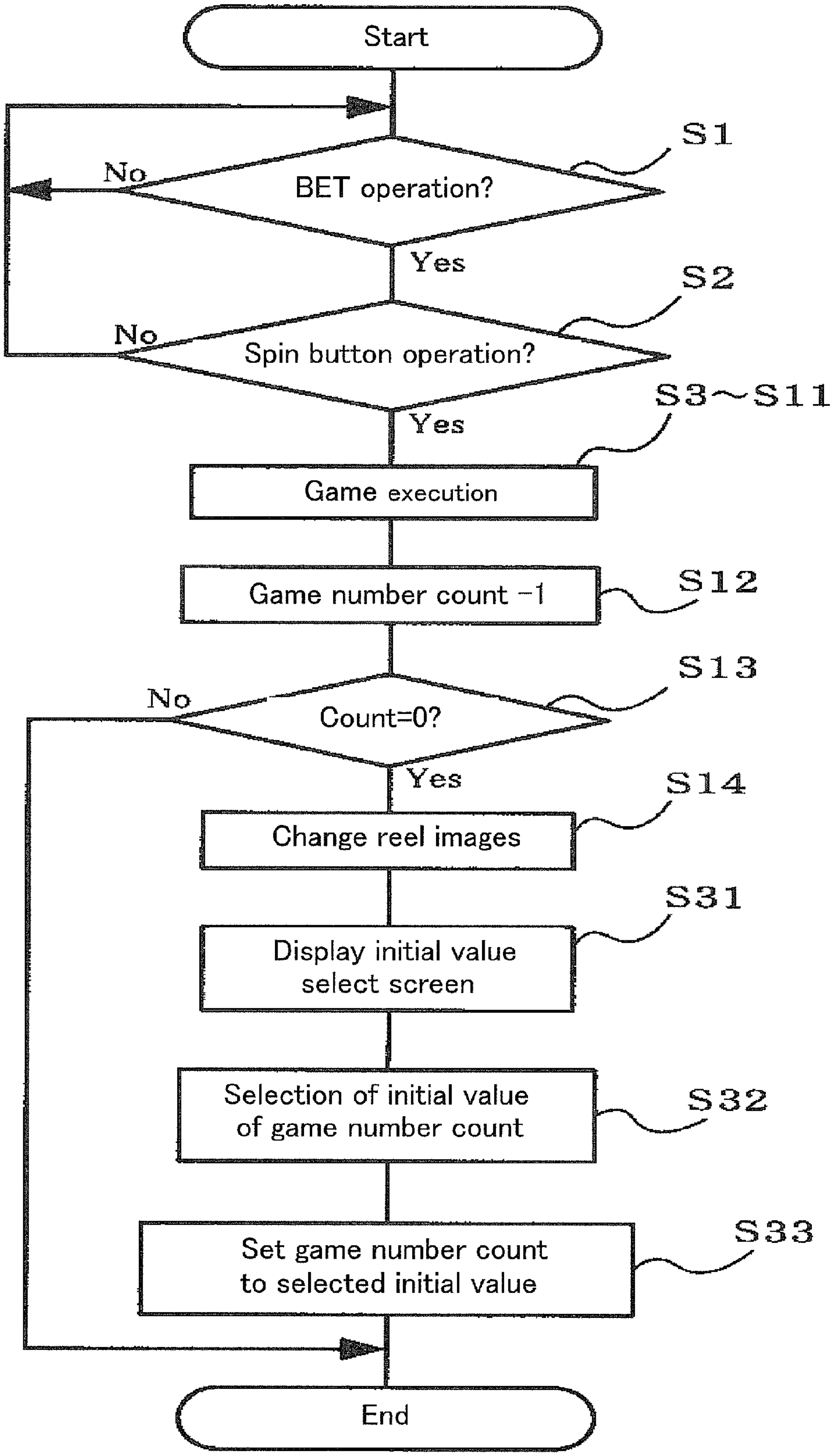
FIG. 6 is a flowchart showing the progression of a game in a slot machine according to one embodiment of the present invention.

FIG. 6 is a flowchart showing the progression of a game in a slot machine according to Modification 2. It should be noted that S3 to S11 in this flowchart are the same as the above-described S3 to S111, and thus they are omitted in FIG. 5.

In Modification 2, after a change in the reel images, the timing of the next change in the reel images will be selected by a player. More specifically, the CPU 21 of the main controller 20 will cause the display controller 25 to display an initial value select screen on the monitor 11 (S31). On the initial value select screen, game numbers will be displayed that are the initial values of the game number count data, e.g., three options such as 30 games, 50 games, and 70 games. The player will operate one of the BET buttons 7*a*, 7*b*, and 7*c* corresponding to the options in accordance with an explanation provided on the initial value select screen. The CPU 21 of the main controller 20 will determine the initial value corresponding to the operation signal of the BET buttons 7*a*, 7*b*, and 7*c* (S32). Next, the CPU 21 will function as a change timing changing unit, and set the game number count data in the RAM 23 to the determined initial value (S33). Accordingly, a game will be executed in accordance with the initial value of the game number count data selected by the player (the length of the predetermined time period).

As described above, in Modification 2, a player can select the timing of the next change in the reel images. Consequently, it will be possible to satisfy a player's desire regarding the timing at which the reel images will be changed, thereby providing a game performance that is in accordance with individual players.

Note that although the BET buttons 7*a*, 7*b*, and 7*c* are used as an operation unit which a player will operate in Modification 2, a touch panel provided on the monitor 11 could be also be used.

Note also that although a situation was described above in which the units used to determine the timing at which the reel images will be changed is the game number, different units can be also be employed. For example, if time is used as the unit, a time period from the previous change to the reel units until a predetermined time has elapsed (for example, 30 minutes) can be set as the predetermined time period. In addition, for example, if the time of day is used as the unit, the reel images can be changed at a predetermined time of day (10 o'clock, 11 o'clock, 12 o'clock, etc.). Furthermore, for example, if the number of bonus games is used as the unit, the reel images can be changed when a bonus game has been executed three times.

Moreover, the prize winning ratio can be changed in order to change the game performance, e.g., the probability of winning a low dividend prize will be high with the reel images before the change and the probability of winning a high dividend prize is high with the reel images after the change. However, the dividend paying ratio will be set to be constant before and after the change of the reel images. For example, although the payout percentage will change between when the probability of winning a low dividend prize is high and when the probability of winning a high dividend is high, the payout percentage will be set to be constant on average.

A computer program that will cause a computer to execute the above-described methods and computer-readable storage media that will store this program are within the scope of the present invention. Here, computer-readable storage media include floppy discs, hard disc drives, CD-ROM, MO, DVD, DVD-ROM, DVD-RAM, BD (Blu-ray Discs), and semiconductor memories, for example. The computer program is not limited to that which is stored on a storage medium, and includes a program transmitted through telecommunication lines, radio or cable communication lines, or networks including the Internet.

The present invention can be appropriately applied to amusement machines such as slot machines, pachinko machines, pachislot machines, and palot machines because it can improve game performance.

General Interpretation of Terms

In understanding the scope of the present invention, the term "configured" as used herein to describe a component, section or part of a device includes hardware and/or software that is constructed and/or programmed to carry out the desired function. In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Finally, terms of degree such as "substantially", "about" and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents.

What is claimed is:

1. A video slot machine in which a plurality of reel images provide the appearance of mechanical slot machine reels, each reel image of the plurality of the reel images defining a virtual reel that includes a symbol arrangement having a plurality of symbols including at least two types of arranged symbols, at least one symbol of the symbol arrangement of each reel image being displayed on a monitor of the video slot machine such that the symbols of the symbol arrangement of each reel image selectively undergoes virtual rotation on the monitor of the video slot machine when a game is played, the video slot machine comprising:

a reel image recording unit that stores a different reel image having a different symbol arrangement;

a game controller configured to control a game that includes virtual rotation of the plurality of reel images on the monitor of the video slot machine in response to a BET operation;

a display controller configured to control the monitor such that the symbols of the plurality of reel images selectively undergo virtual rotation on the monitor of the video slot machine and are then stopped for display on the monitor of the video slot machine;

a change timing determination unit configured to determine when it is time to change the reels images; and a reel image changing unit configured to replace the symbol arrangement of at least one reel image of the plurality of reel images after completion of a game and before playing another game with the different reel image having the different symbol arrangement when the change timing determination unit determines that it is time to change the reel images such that the symbol arrangement of the at least one reel image and the different symbol arrangement the different reel image have at least one of the following relationships:

the symbol arrangement of the at least one reel image includes a greater number of symbols that provide for an increased in probability for winning a low dividend prize than the different symbol arrangement of the different reel image, the different symbol arrangement of the different reel image includes a greater number of symbols that provide for an increased in probability for winning a high dividend prize than the symbol arrangement of the at least one reel image, the symbol arrangement of the at least one reel image includes a greater number of symbols that provide for an increased in probability for winning a high dividend prize than the different symbol arrangement of the different reel image, and the different symbol arrangement of the different reel image includes a greater number of symbols that provide for an increased in probability for winning a low dividend prize than the symbol arrangement of the at least one reel.

2. A video slot machine according to claim 1, further comprising a determination unit configured to determine the symbol to be stopped and displayed for each of the reel images in response to the BET operation; and wherein the reel image changing unit will change the at least one reel image between the point at which a unit game is completed and the point at which the determination unit determines the symbols to be stopped in the next unit game.

3. A video slot machine according to claim 1, wherein the display controller is configured to display the timing of the change to the at least one reel image on the monitor.

4. A video slot machine according to claim 1, wherein the reel image changing unit will replace all of the plurality of reel images displayed on the monitor with a plurality of other reel images.

5. A video slot machine according to claim 1, wherein the reel image changing unit alternates between the at least one reel image of the plurality of reel images and the different reel image displayed on the monitor.

6. A video slot machine according to claim 1, further comprising a prize winning determination table configured to store the relationships between combinations of symbols to be stopped and displayed and a plurality of prizes; and a prize winning determination unit configured to determine when a prize has been won based upon a current combinations of symbols displayed on the monitor with the reel images stopped with reference to the prize winning determination table;

wherein one or more of the prizes will be deleted, or a new prize will be added, in the prize winning determination table in conjunction with replacement of the at least one reel image by the reel image changing unit.

7. A video slot machine according to claim 6, wherein the reel images after the change will include a new symbol that was not included in the reel images before the change, and a new prize corresponding to the new symbol will be added in the prize winning determination table.

8. A video slot machine according to claim 1, wherein a predetermined payout ratio will be constant before and after the change to the at least one reel image performed by the reel image changing unit.

9. A video slot machine according to claim 1, further comprising a change timing changing unit configured to change the timing of the change to the at least one reel image;

a receiving unit configured to receive timing from a player as the timing of the change; and wherein the change timing changing unit will change the timing of the change of the at least one reel image to the timing received from the player.

10. A video slot machine according to claim 1, further comprising a change timing changing unit configured to change the timing of the change to the at least one reel image;

a change timing lottery unit configured to determine the timing of the change of the at least one reel image by lottery; and wherein the change timing changing unit will change the timing of the change to the at least one reel image to the timing determined by the change timing lottery unit.

11. A method for controlling a video slot machine in which a plurality of reel images provide the appearance of mechanical slot machine reels, each reel image of the plurality of reel images defining a virtual reel that includes a symbol arrangement having a plurality of symbols including at least two types of arranged symbols, at least one symbol of the symbol arrangement of each reel image being displayed on a monitor of the video slot machine such that the symbol arrangement of each of the reel images undergoes selective virtual rotation on the monitor of the video slot machine when a game is played, the control method comprising the steps of:

storing a different reel image having a different symbol arrangement;

controlling a game comprising one or more unit games in response to a BET operation;

controlling the monitor such that the symbols of the plurality of reel images undergo virtual rotation on the monitor and are then stopped and displayed in the unit game;

determining when it is time to change the reel images; and replacing the symbol arrangement of at least one reel image of the plurality of reel images with the different symbol arrangement of the different reel image after completion of a game and before playing another game such that the symbol arrangement of the at least one reel image and the different symbol arrangement of the different reel image have at least one of the following relationships:

the symbol arrangement of the at least one reel image includes a greater number of symbols that provide for an increased in probability for winning a low dividend prize than the different symbol arrangement of the different reel image, the different symbol arrangement of the different reel image includes a greater number of symbols that provide for an increased in probability for winning a high dividend prize than the symbol arrangement of the at least one reel image, the symbol arrangement of the at least one reel image includes a greater number of symbols that provide for an increased in probability for winning a high dividend prize than the different symbol arrangement of the different reel image, and the different symbol arrangement of the different reel image includes a greater number of symbols that provide for an increased in probability for winning a low dividend prize than the symbol arrangement of the at least one reel.

12. A computer readable storage medium storing a control program that will be executed by a video slot machine in which a plurality of reel images that provide the appearance of mechanical slot machine reels, each reel image of the plurality of reel images defining a virtual reel including a symbol arrangement having a plurality of symbols including at least two types of arranged symbols, at least one symbol of the symbol arrangement being displayed on a monitor of the video slot machine such that each reel image and corresponding symbols undergoes selective virtual rotation on the monitor of the video slot machine when a game is played, the control program executing the steps of:

storing a different reel image having a different symbol arrangement;

controlling a game comprising one or more unit games in response to a BET operation;

controlling the monitor such that the symbols of the plurality of reel images will be successively changed and then stopped and displayed in the unit game;

determining when it is time to change the reel images; and replacing the symbol arrangement of at least one reel image of the plurality of reel images with the different symbol arrangement of the different reel image after completion of a game and before playing another game such that the symbol arrangement of the at least one reel image and the different symbol arrangement of the different reel image have at least one of the following relationships:

the symbol arrangement of the at least one reel image includes a greater number of symbols that provide for an increased in probability for winning a low dividend prize than the different symbol arrangement of the different reel image, the different symbol arrangement of the different reel image includes a greater number of symbols that provide for an increased in probability for winning a high dividend prize than the symbol arrangement of the at least one reel image, the symbol arrangement of the at least one reel image includes a greater number of symbols that provide for an increased in probability for winning a high dividend prize than the different symbol arrangement of the different reel image, and the different symbol arrangement of the different reel image includes a greater number of symbols that provide for an increased in probability for winning a low dividend prize than the symbol arrangement of the at least one reel.

* * * * *